(12) United States Patent
Petersen

(10) Patent No.: US 11,849,663 B2
(45) Date of Patent: Dec. 26, 2023

(54) MULTI-UNIT BULK SEED-BOX SEED TENDER

(71) Applicant: UNVERFERTH MANUFACTURING COMPANY, INC., Kalida, OH (US)

(72) Inventor: Brian James Petersen, Ottawa, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 17/724,229

(22) Filed: Apr. 19, 2022

(65) Prior Publication Data
US 2022/0232758 A1 Jul. 28, 2022

Related U.S. Application Data

(63) Continuation of application No. 17/145,527, filed on Jan. 11, 2021, now abandoned, which is a continuation of application No. 16/694,178, filed on Nov. 25, 2019, now abandoned.

(51) Int. Cl.
*A01C 15/00* (2006.01)

(52) U.S. Cl.
CPC .......... *A01C 15/005* (2013.01); *A01C 15/003* (2013.01)

(58) Field of Classification Search
CPC . B60P 7/13; B60P 7/08; A01C 15/005; A01C 15/003; B64D 9/003; B60R 2011/007
See application file for complete search history.

(56) References Cited

U.S. PATENT DOCUMENTS

| | | |
|---|---|---|
| 3,296,981 A | 1/1967 | Bergstrand |
| 3,498,238 A | 3/1970 | Sweger |
| 3,779,428 A | 12/1973 | Bauman |
| 3,868,083 A | 2/1975 | Titcombe |
| 5,622,116 A | 4/1997 | Carlton |
| 5,957,640 A | 9/1999 | Schmieke et al. |
| 6,053,692 A | 4/2000 | Mason et al. |

(Continued)

OTHER PUBLICATIONS

Yetter, Maverick Opener, Bulk Seed Handling, Seed Jet II, Yetter Farm Equipment, http://www.yetterco.com/bulkseed/bulkseed1.html, Aug. 15, 2000, 4 pages.

(Continued)

*Primary Examiner* — Kaitlin S Joerger
(74) *Attorney, Agent, or Firm* — Rothwell, Figg, Ernst & Manbeck, P.C.

(57) ABSTRACT

A farm implement is provided. The farm implement includes a frame having a bed and a conveyor mounted to the frame. The farm implement further includes a latch mechanism for securing two or more bulk seed-boxes mounted on a plurality of bulk seed-box locations. The latch mechanism includes a handle to activate the latch mechanism and two or more latches located adjacent to one or more of the bulk seed-box locations, and is moveable between a latched position and an unlatched position. In the latched position, the two or more latches are configured to engage with the bulk seed-boxes to secure the bulk seed-boxes to the bed. In the unlatched position, the two or more latches are configured to disengage from the bulk seed-boxes to allow for the bulk seed-boxes to be unloaded from or loaded onto the bed.

13 Claims, 12 Drawing Sheets

(56) References Cited

U.S. PATENT DOCUMENTS

| | | | |
|---|---|---|---|
| 6,085,928 A | 7/2000 | Dickinson et al. | |
| 6,092,974 A | 7/2000 | Roth | |
| 6,315,508 B1 | 11/2001 | Nadon | |
| 6,425,717 B1 | 7/2002 | Saggio et al. | |
| 6,425,725 B1 | 7/2002 | Ehlers | |
| 6,695,553 B1 | 2/2004 | Galbreath et al. | |
| 6,736,585 B2 | 5/2004 | O'Daniel | |
| 6,964,551 B1 | 11/2005 | Friesen | |
| 7,500,817 B2 | 3/2009 | Furrer et al. | |
| 8,303,236 B2 * | 11/2012 | Beck | A01C 15/003 414/526 |
| 9,242,730 B2 * | 1/2016 | Larson | B60P 7/13 |
| 2010/0068021 A1 | 3/2010 | Petersen et al. | |

OTHER PUBLICATIONS

Yetter, "1300 Serias Bulk Seed Handling Equipment Parts & Set-Up Manual", Dec. 2003, 48 pages.

Yetter, Bulk Seed Handling, "Seed Box Train TM" System for Bulk Seed Boxes, Yetter Farm Equipment, http://www.yetterco.com/bsh.html, Dec. 3, 1998, 2 pages.

Yetter, "Yetter Defining Solutions", Leading Edge Product Selection Guide, 1998-99, 2 pages.

Yetter, Maverick Opener, "What's New at Yetter", http://www.yetterco.com/new.html, Dec. 10, 2000, 4 pages.

Yetter, "1300 Series Bulk Seed Handling Equipment, Parts & Set-Up Manual", 2565-463_REV_C, Yetter Farm Equipment, Sep. 2012, 54 pages.

Yetter, Maverick Opener "Early Bird" Order Bonus for Bulk Seed Handling Products, News Release, New Product, http://www.yetterco.com/pressrelease/earlybird_bonus.html, Jan. 11, 2001, 2 pages.

Yetter, Generation II, Maverick Opener, Bulk Seed Handling, Seed Jet II, htt://www.yetterco.com/bulkseed/bulkseed1.html, Aug. 3, 2001, 5 pages.

* cited by examiner

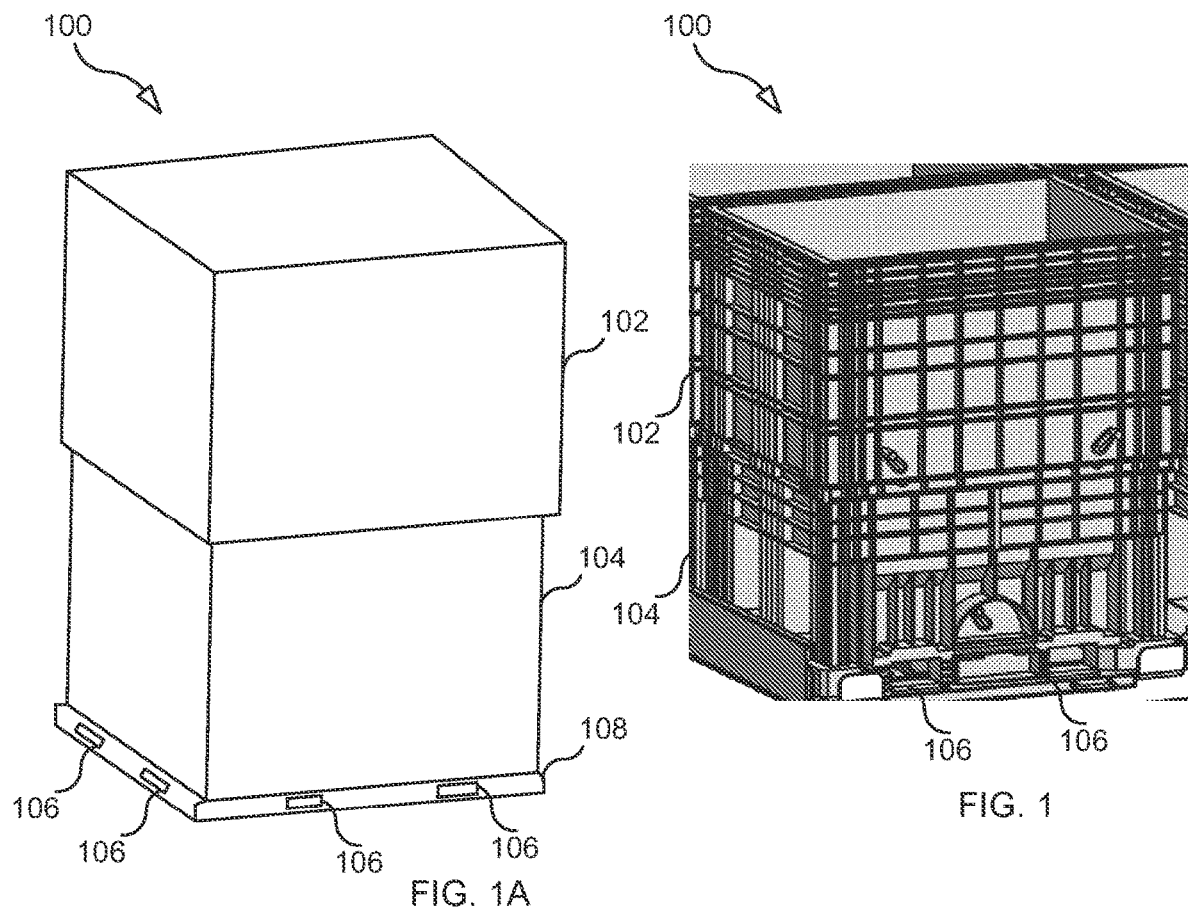
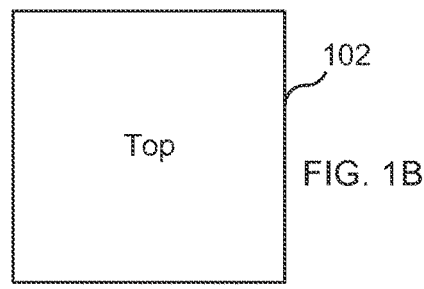
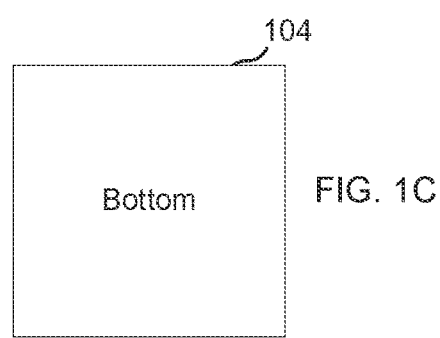
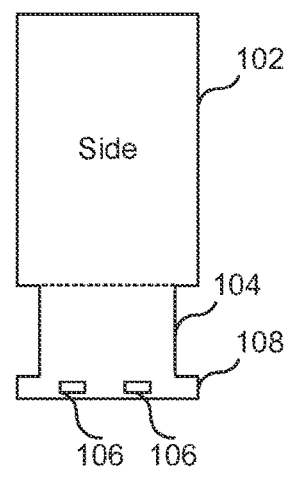

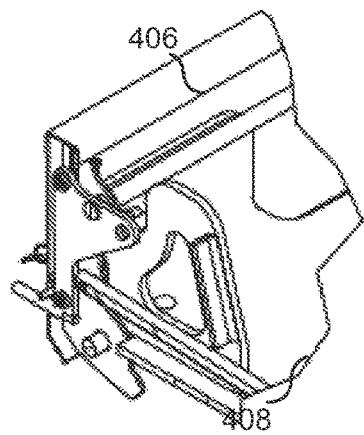
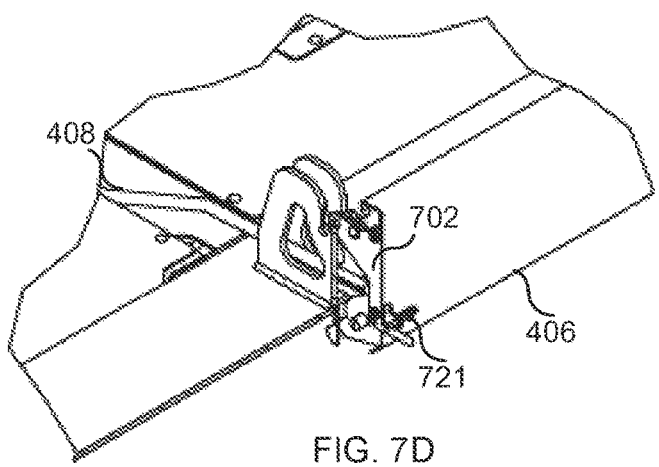
FIG. 7C  FIG. 7D
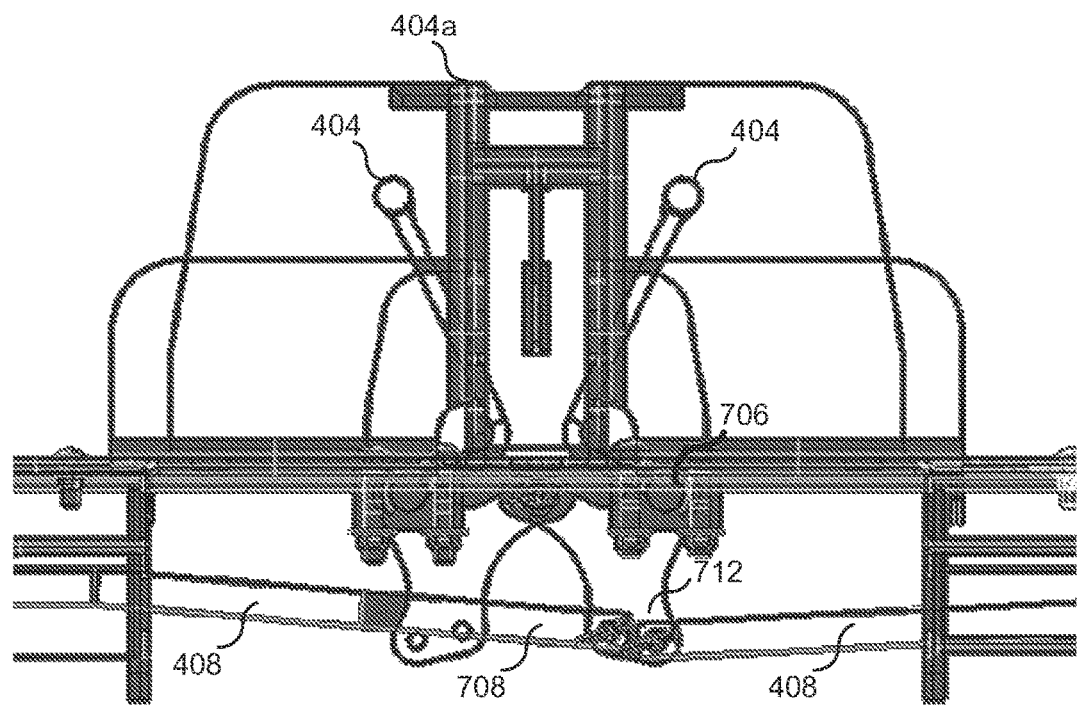
FIG. 7E

MULTI-UNIT BULK SEED-BOX SEED TENDER

CROSS-REFERENCE TO RELATED APPLICATIONS

This application is a continuation of U.S. patent application Ser. No. 17/145,527, filed on Jan. 11, 2021, which is a continuation of Ser. No. 16/694,178, now abandoned, filed on Nov. 25, 2019, the entire disclosures of which are incorporated herein by reference.

FIELD OF DISCLOSURE

This disclosure relates generally to farm implements, and more particular, to seed tenders for handling multi-unit bulk seed-boxes.

BACKGROUND

Seed and grain is sold and transported in bulk. Seed and grain can be pre-packaged or loaded in bulk onto a wagon or trailer. One way that is commonly used to pre-package seed and grain is to use a bulk seed-box, such as a Pro-Box seed-box. Such bulk seed-boxes are loaded with material by the manufacturer or vendor and are purchased fully loaded by the consumer.

Over time, the seed industry has progressed from using small 50-pound bags to deliver seed, to using bulk seed-boxes for more of its needs. These bulk seed-boxes are uniform in shape and size throughout the industry, and hold approximately 50 seed units each (one seed unit may be specified by weight or number of seeds and may vary depending on crop). Various methods are used to transfer the seed from these bulk seed-boxes to a planter or other farm implement. One such method is to have a seed tender that allows multiple boxes to be set on top of a bed with a conveying system underneath the bed. The seed then drops out of the bulk seed-box into the conveying system, which transfers it into the planter.

Various methods are currently being used in the industry to secure the bulk seed-boxes. Improvements in such methods are needed.

SUMMARY

Existing methods of securing bulk seed-boxes require multiple latches to be manually engaged in order to secure the bulk seed-boxes to the bed of a seed tender. As the number of bulk seed-boxes used increases, the corresponding number of latches required for securing the bulk seed-boxes grows quickly, and access to all the latches becomes difficult and time-consuming. That is, the existing methods of securing bulk seed-boxes effectively limit the number of bulk-seed boxes that may be used, and current designs are typically for only two or four bulk seed-boxes. As the number of bulk-seed boxes used increases, such methods become more and more burdensome.

Embodiments provide for a latch system to secure multiple bulk seed-boxes with a single point activation. That is, the latch system allows multiple bulk seed-boxes (e.g., six bulk seed-boxes, eight bulk seed-boxes, or more) to be secured at the same time. Accordingly, embodiments provide for an easy-to-use system which can readily expand to accommodate an increasing number of bulk seed-boxes, without a corresponding increase in complexity or burden to a user.

According to a first aspect, a farm implement is provided. The farm implement includes a frame having a bed, a first conveyor mounted to the frame having an intake end to receive agricultural material from four or more bulk seed-boxes mounted on the plurality of bulk seed-box locations and a discharge end to discharge the agricultural material; and a latch mechanism for securing the four or more bulk seed-boxes mounted on the plurality of bulk seed-box locations. The bed comprises a plurality of bulk seed-box locations. The latch mechanism includes a first handle to activate the latch mechanism and four or more latches located adjacent to four or more of the bulk seed-box locations. Two of the four or more bulk seed-box locations are spaced apart in a lateral direction and two of the four or more bulk seed-box locations are spaced apart in a longitudinal direction. The first handle is configured to move the latch mechanism between a latched position and an unlatched position. In the latched position, the four or more latches are configured to engage with the four or more bulk seed-boxes mounted on the plurality of bulk seed-box locations to secure the four or more bulk seed-boxes to the bed, and in the unlatched position, the four or more latches are configured to disengage from the four or more bulk seed-boxes mounted on the plurality of bulk seed-box locations to allow for the bulk seed-boxes to be unloaded from or loaded onto the bed.

In some embodiments, the farm implement is a seed tender. In some embodiments, the plurality of bulk seed-box locations are arranged in two or more rows and include at least six bulk seed-box locations. In some embodiments, the latches are configured to engage a lower flange of the four or more bulk seed-boxes mounted on the plurality of bulk seed-box locations. In some embodiments, the latches are configured to engage an indentation in the four or more bulk seed-boxes mounted on the plurality of bulk seed-box locations. In some embodiments, the latch mechanism further includes a first push rod coupled to a first set of the four or more latches, and the first handle is configured to move the latch mechanism between a latched position and an unlatched position by moving the first push rod, and movement of the first push rod engages or disengages the first set of four or more latches.

In some embodiments, the four or more bulk seed-box locations are arranged in rows and columns, and for each bulk seed-box location in a given column, the latches corresponding to those bulk seed-box locations are coupled by a rod that extends transversely from the first push rod. In some embodiments, the latch mechanism further includes a second handle to activate the latch mechanism and a second push rod coupled to a second set of the four or more latches, and wherein the second handle is configured to move the latch mechanism between a latched position and an unlatched position by moving the second push rod, and wherein movement of the second push rod engages or disengages the second set of four or more latches.

In some embodiments, the farm implement further includes a rail mechanism, wherein the first conveyor is configured to move in a fore-and-aft direction with respect to the bed along the rail mechanism, thereby allowing the first conveyor to be positioned such that the intake end is underneath a dispensing region of a bulk seed-box from among the four or more bulk seed-boxes mounted on the plurality of bulk seed-box locations. In some embodiments, the farm implement further includes a hopper mounted to the frame and positioned underneath the bed to receive agricultural material from the four or more bulk seed-boxes mounted on the plurality of bulk seed-box locations and to provide the agricultural material to the intake end of the first conveyor. In some embodiments, the first conveyor is mounted to the frame by a support arm, and is pivotable such that the discharge end of the first conveyor can be positioned over a planter in order to discharge agricultural material into the planter. In some embodiments, the farm implement further includes a second conveyor for transferring agricultural material from the four or more bulk seed-boxes mounted on the plurality of bulk seed-box locations to the intake end of the first conveyor. In some embodiments, the second conveyor is generally parallel to the frame bed.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

FIGS. 1 and 1A-1D illustrate an exemplary bulk seed-box.

FIGS. 7, 7A, 7B, 7C, 7D, and 7E illustrate a bed of a farm implement in a latched position according to some embodiments.

DETAILED DESCRIPTION

Figure 2:
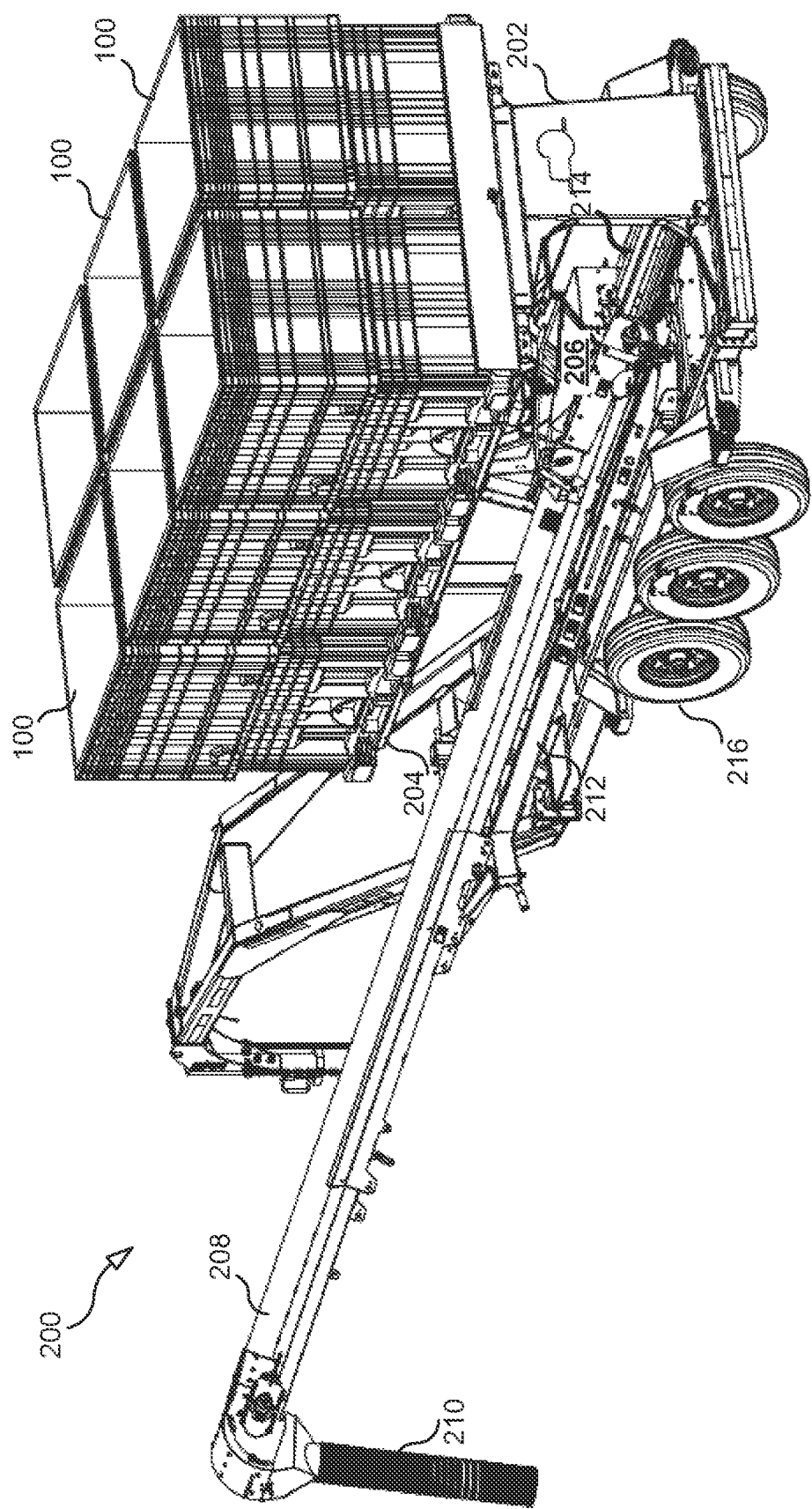
FIG. 2 illustrates a farm implement according to some embodiments.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by persons of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the term "mount" or "mounted" refers to a state where a first component is securely attached to a second component, such that the first component is supported by the second component and is substantially restricted of movement with respect to the second component.

FIGS. 1 and 1A-1D illustrate an exemplary bulk seed-box. As shown, bulk seed-box 100 may include an upper portion 102 and lower portion 104. For instance, the width and/or length of the upper portion 102 may generally be greater than the width and/or length of the lower portion 104, and the lower portion 104 may be tapered. This may allow the bulk seed-box to be collapsible for easy transport when it is empty for instance. In some embodiments, the lower portion 104 may include a flange 108 that surrounds the outside of the lower portion 104 and extends outward therefrom. As shown, the top and bottom profiles are generally square (see FIGS. 1B, 1C), and the side profile is generally rectangular (see FIG. 1D). The bulk seed-box 100 is generally taller than it is wide. The bulk seed-box is configured to contain seed and, when full, may weigh a considerable amount depending on the nature of seed that it is filled with (e.g., about 200 lbs-2500 lbs, or more or less). In order to facilitate moving the bulk seed-boxes 100 when they are full of seed and potentially too heavy to be moved manually, indentations 106 extend through the lower portion 104 such that the forks of a fork lift (or other implement) may be inserted into indentations 106 and can load the bulk seed-box 100 onto a seed tender. Indentations 106 may be present on each side of the bulk seed-box 100 such that a fork lift (or other implement) may be able to handle the bulk seed-box 100 from any direction.

The bulk seed-box 100 is able to dispense seed contained within the bulk seed-box 100. For example, a mechanism (e.g., a slide gate) may enable flow control to control the flow at which seed exits from the bulk seed-box 100. This mechanism may be mechanical and/or electronic, and it may be operated manually and/or through digital controls. To facilitate the unloading of seed, the interior of the bulk seed-box 100 may be angled (e.g., like a funnel). The bulk seed-box 100 may contain a dispensing region (not shown), which is the region where seed is dispensed from the bulk seed-box 100. The dispensing region may be located on a bottom of the bulk seed-box 100 (e.g., on lower portion 104), and may be located offset from center. For example, the dispensing region may be located in a corner area. In this way, for instance, four bulk seed-boxes 100 may be positioned adjacent to one another in a two-by-two pattern, such that their respective dispensing regions are located next to each other.

In general, embodiments disclosed in the present application are applicable with any bulk seed-box that is capable of holding and dispensing grain or another type of seed or agricultural material.

FIG. 2 illustrates a farm implement 200 according to some embodiments. As shown, six bulk seed-boxes 100 are positioned on a bed 204 of frame 202. The frame 202 could be configured to allow less than six boxes or more than six boxes. For example, frame 202 supports, in some embodiments, up to eight bulk seed-boxes 100, and may support anywhere from two to sixteen bulk seed-boxes 100, or more than sixteen bulk seed-boxes 100. The bulk seed-boxes 100 may be arranged in a single row or in multiple rows. For example, as shown, the six bulk seed-boxes 100 are arranged in two rows of three bulk seed-boxes 100 each. In some embodiments, more than two rows may be employed. For example, a farm implement supporting eight bulk seed-boxes 100 could have two rows each having four bulk seed-boxes 100, or three rows where two of the three rows have three bulk seed-boxes 100 and the third row has two bulk seed-boxes 100, or four rows each having two bulk seed-boxes 100. In practice, the dimensions of the bulk seed-boxes together with other considerations (such as whether the farm implement 200 is designed to travel on roadways such as highways or interstates) may constrain the number of rows that are used.

The bulk seed-boxes 100 are sitting on bed 204 with a hopper 206 below the bed 204. The hopper 206 collects the seed which is diverted from the bulk seed-boxes 100 and eventually passed into a seed planter or otherwise unloaded by operation of conveyor 208. As noted above, the bulk seed-boxes 100 may be configured with dispensing regions such that four bulk seed-boxes 100 in a two-by-two arrangement may have dispensing regions next to each other. In such an arrangement, a hopper 206 may be positioned in the area of the dispensing regions of each of the bulk seed-boxes 100. For more than four bulk-seed boxes 400, or where there is not a two-by-two arrangement of such boxes, the hopper 206 needs to either be of sufficient dimension (such as in an elongated trough shape) in order to collect seed from each of the bulk seed-boxes 100, or the hopper 206 needs to be movable. As shown in FIG. 2, conveyor 208 may be attached to a lower portion of frame 202 such that it is moveably connected to rail assembly 214. The conveyor 208 may move along the rail assembly 214 in a lengthwise, or fore-and-aft, direction with respect to the farm implement 200. By such movement, the hopper 206 may be positioned below the dispensing regions of each of the bulk seed-boxes as needed.

Conveyor 208 may also be supported by a supporting arm 212, which may be allowed to pivot such that the conveyor 208 can be moved to allow the discharge spout 210 to be positioned over a planter in which seed is being transferred. Alternatively, conveyor 208 and/or supporting arm 212 may be attached to a rotating base on frame 202, which similarly allows the discharge spout 210 to be positioned over a planter in which seed is being transferred.

In some embodiments, frame 202 may be moveable. For example, there may be a set of axles affixed to a lower portion of frame 202, which allow for wheels 216 to be mounted thereto so as to permit the frame to move. Frame 202 may also support moveable track (e.g. a track propulsion system), or any other type of movement suitable to farm implement 200.

Figure 3:
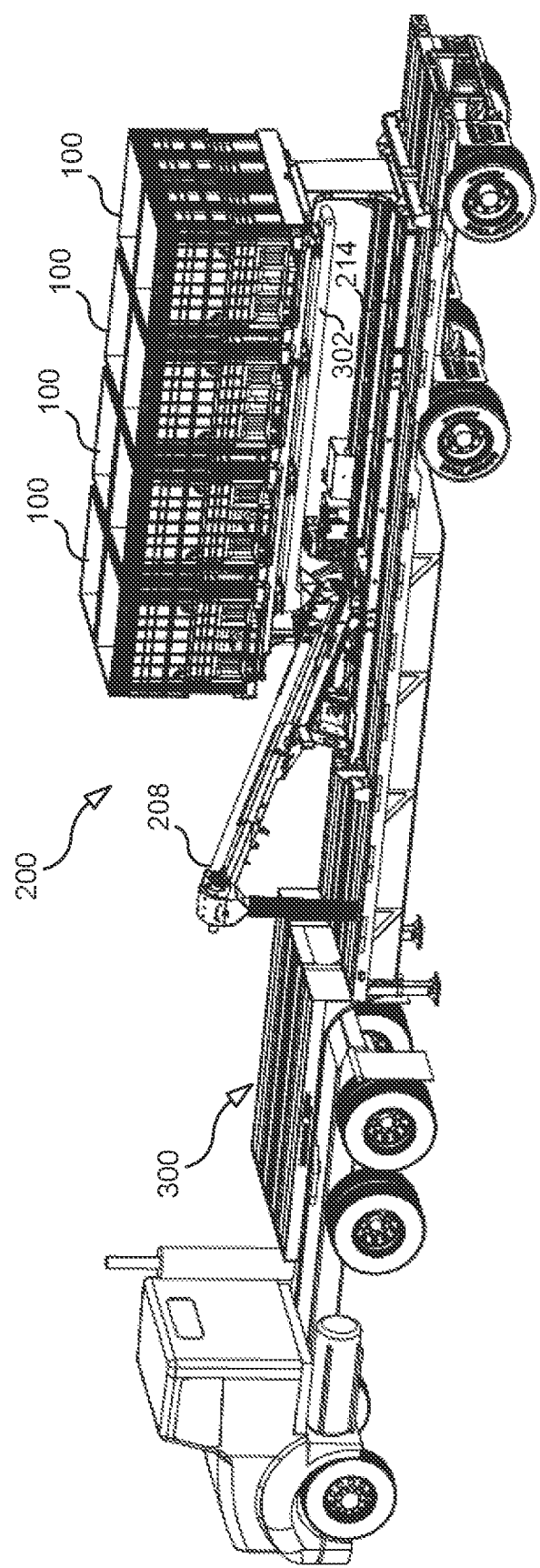
FIG. 3 illustrates a farm implement according to some embodiments.

FIG. 3 illustrates a farm implement 200 according to some embodiments. As shown, farm implement 200 includes eight bulk seed-boxes 100. In this configuration, the frame 202 is mounted on a commercially available trailer 300. As shown, there may be a second conveyor 302 for transferring the seed along the length of the trailer to the upright conveyor 208 which ultimately transfers the seed to the planter. Alternatively, or in addition, rail assembly 214 may allow conveyor 208 to be positioned where grain is being dispensed from any of the bulk seed-boxes 100.

Figure 4:
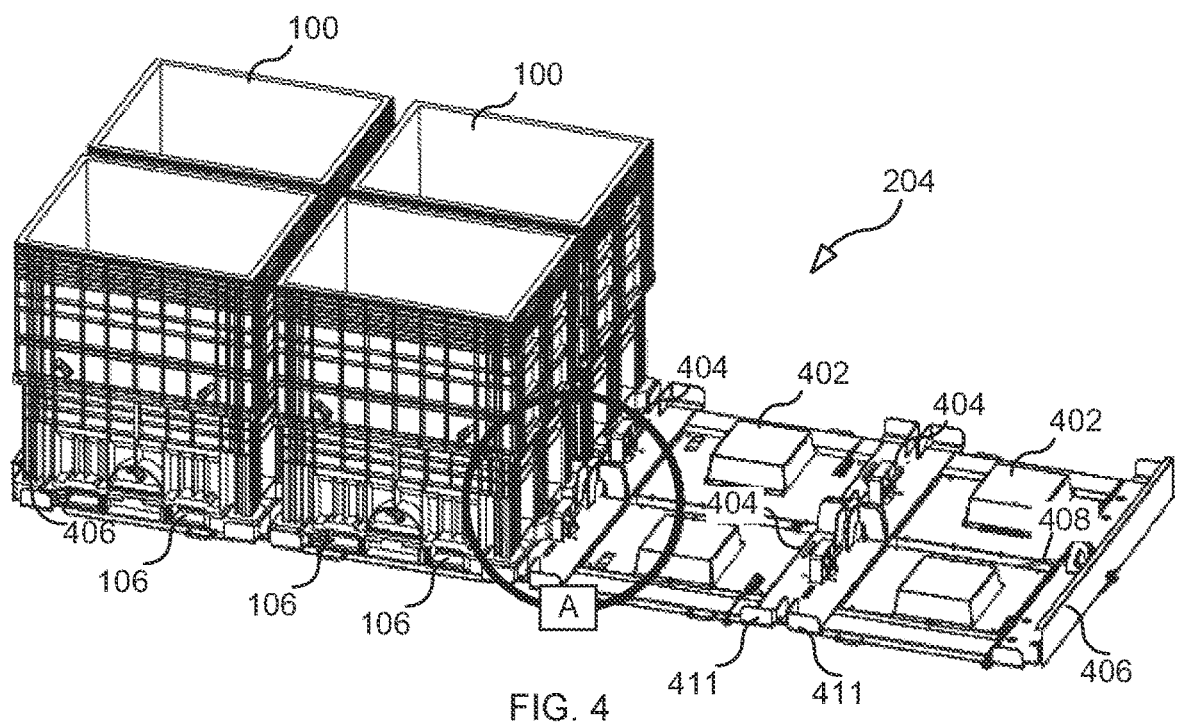
FIGS. 4 and 4A illustrate a bed of a farm implement in a latched position according to some embodiments.
Figure 4A:
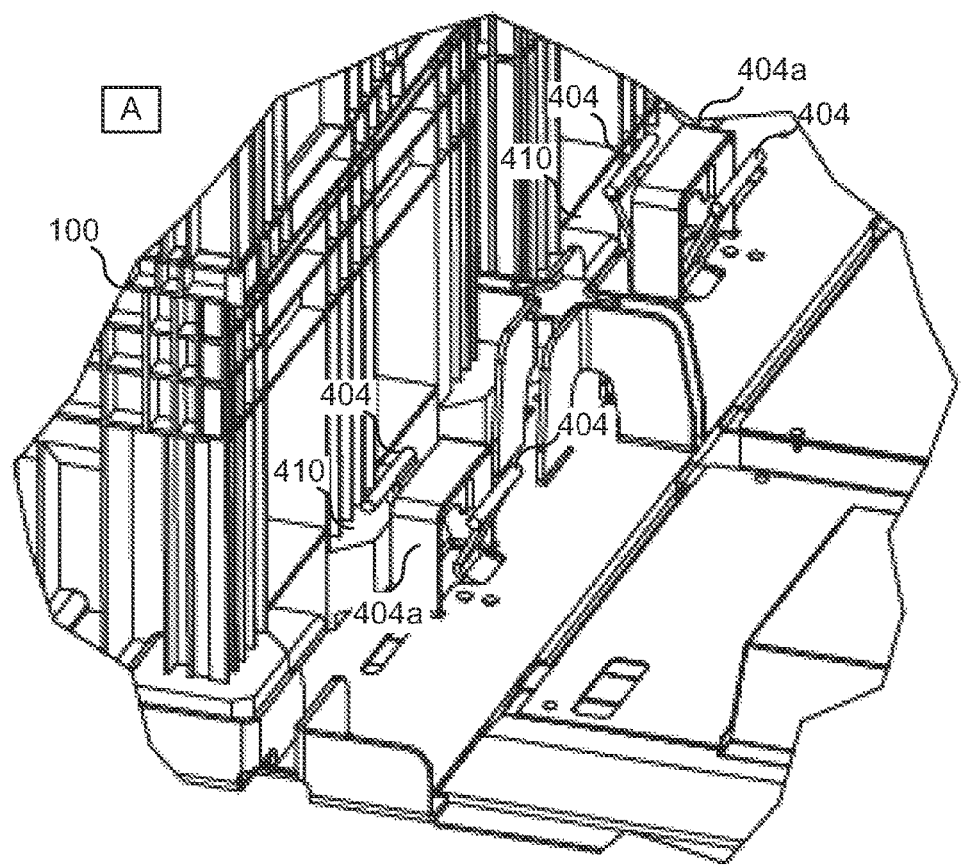

FIG. 4 illustrates a bed 204 of a farm implement 200 according to some embodiments. As shown, bed 204 in FIG. 4 is for an eight-box configuration. There are four bulk seed-boxes 100 positioned on bed 204 and four locations for bulk seed-boxes 100 that do not currently have a bulk seed-box 100 positioned at those locations. FIG. 4 includes a circle labeled "A" which is shown in more detail in FIG. 4A. The latch system of bed 204 will now be described with reference to FIGS. 4 and 4A.

Bed 204 may include outer perimeter flanges 411 that hold the bulk seed-boxes 100 in place, and prevent side-to-side and for-to-aft movement of the boxes 100. For example, there may be a flange 411 positioned at or about the corners of each of the boxes 100. Bed 204 may also include funnel areas 402, one for each bulk seed-box 100 that the bed 204 is configured to carry. Such funnel areas 402, in some embodiments, may be positioned in approximately the center of a bulk seed-box location, though they may be offset from center in other embodiments. The funnel areas 402 can help to receive seed contained in the bulk seed-boxes 100, funneling the seed into the hopper 206 and ultimately the conveyor 208.

Latches 404 may be used to secure the bulk seed-box 100 to the bed 204. As shown, for each row of bulk seed-boxes 100, there is a central latch 404 positioned between pairs of bulk seed-boxes 100. At the ends of bed 204, there are end panels 406. FIG. 4 illustrates a latched position. This can be seen, for example, in the detailed view FIG. 4A, where latches 404 extend beyond a latch housing 404a and engage a lower flange 410 of the bulk seed-box 100. Alternatively, or in addition, a latch could engage indentations 106. As shown, latches 404 include a round rod that pivots over top of the flange 410. Each latch housing 404a houses two latches 404 (one on each side) in order to secure bulk seed-boxes 100 on either side of housing 404a. The two latches 404 within housing 404a may be controlled together or may be controlled independently from each other. Latches 404 are affixed to the bed 204, and therefore hold the bulk seed-boxes 100 in place, e.g., in the event that an upward force is applied to the bulk seed-boxes 100 that would otherwise tend to move the bulk seed-boxes upward.

The forward and rear end panels 406 are shown in an upright position, indicating that the mechanism is latched. As shown, there is a push rod 408 coupled to end panel 406, which operates the latch mechanism to be further described herein.

Figure 5:
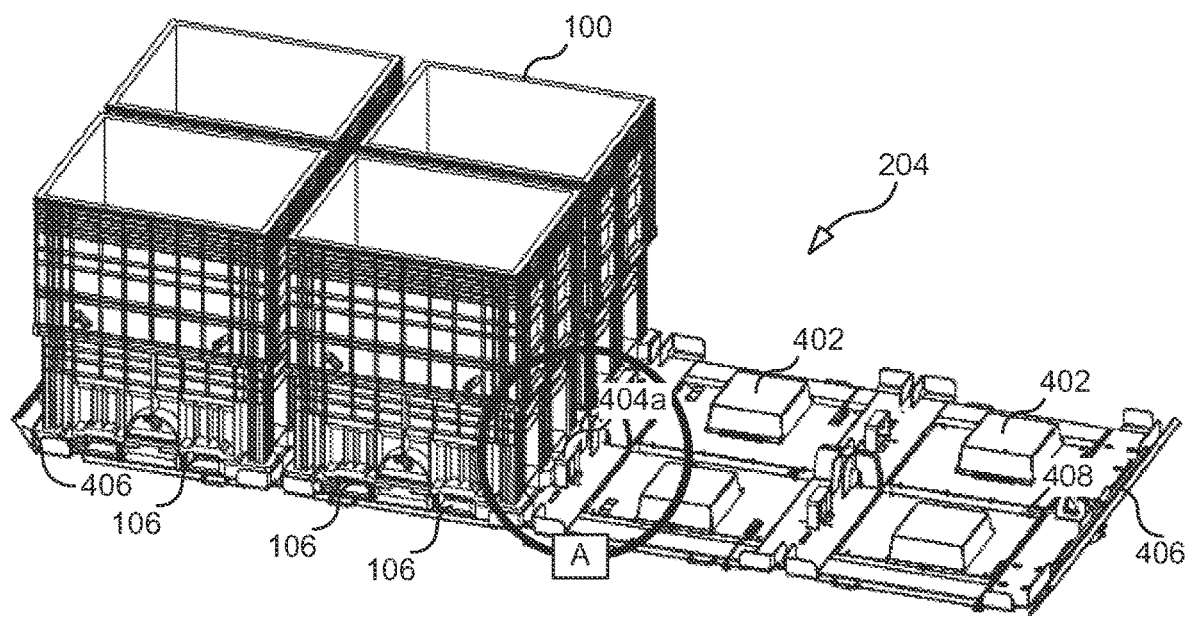
FIGS. 5 and 5A illustrate a bed of a farm implement in an unlatched position according to some embodiments.
Figure 5A:
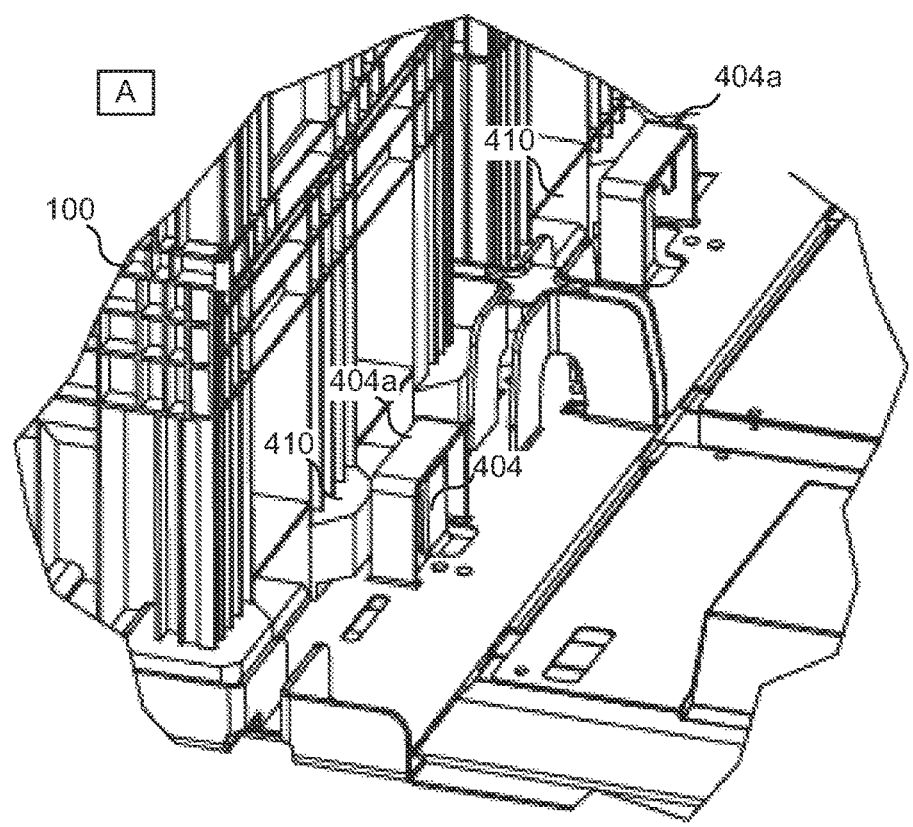

FIG. 5 illustrates a bed 204 of a farm implement 200 according to some embodiments. As shown, bed 204 in FIG. 5 corresponds to the bed 204 shown in FIG. 4. As shown in FIG. 5, however, the latch mechanism is unlatched. This can be seen, for example, in the detailed view FIG. 5A, where latches 404 are within the latch housing 404a and do not engage the lower flange 410 of the bulk seed-box 100. The forward and rear end panels 406 are shown in a downward position, indicating that the mechanism is unlatched.

Figure 6:
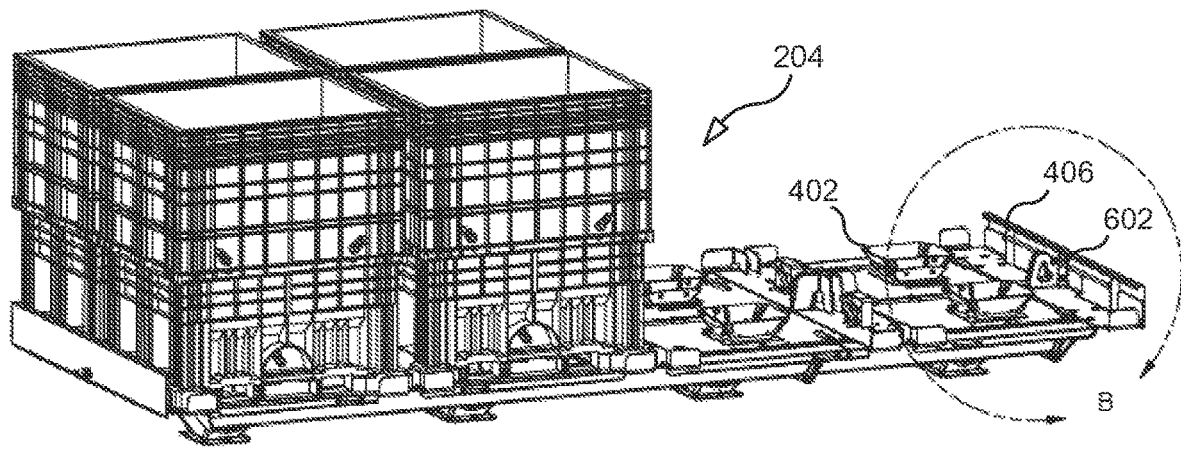
FIGS. 6, 6A, and 6B illustrate a bed of a farm implement according to some embodiments.
Figure 6A:
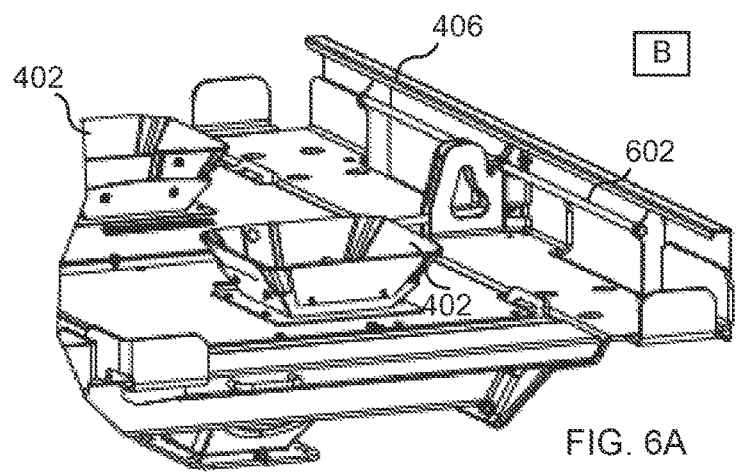
Figure 6B:
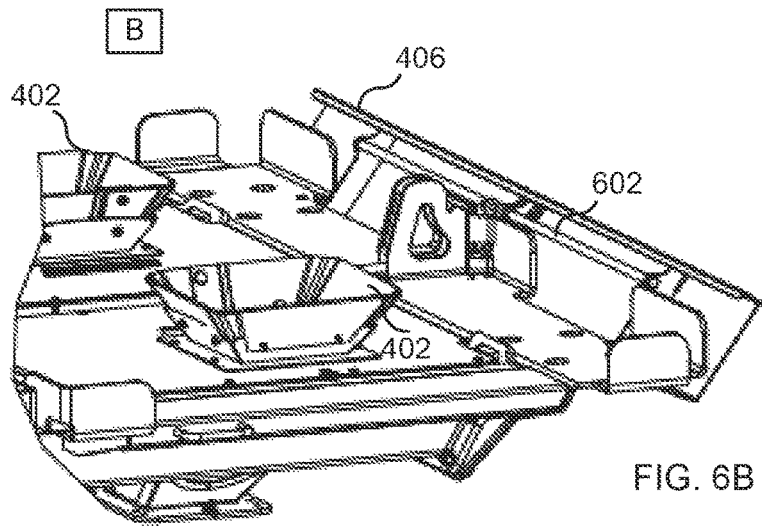

FIG. 6 illustrates a bed 204 of a farm implement 200 according to some embodiments. FIG. 6 includes a circle labeled "B" which is shown in more detail in FIG. 6A (corresponding to a latched position) and FIG. 6B (corresponding to an unlatched position). The end panels 406 each have an engagement mechanism 602 (e.g., a long round bar) to engage the flange on the bulk seed-box 100. The engagement mechanism 602 of the end panels 406 works similarly compared to the latches 404, in that the engagement mechanisms 602 of the end panels 406 hold the bulk seed-boxes 100 in place, e.g., in the event that an upward force is applied to the bulk seed-boxes 100 that would otherwise tend to move the bulk seed-boxes upward. That is, the end panels 406 may pivot to engage the bulk seed-boxes located on the ends of the bed 204.

Figure 7A:
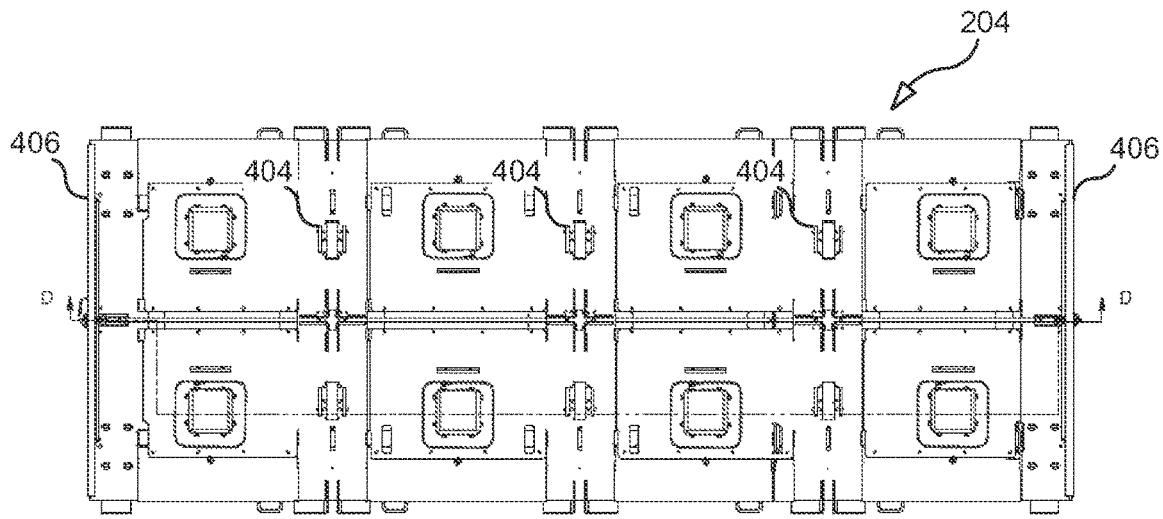
Figure 7:
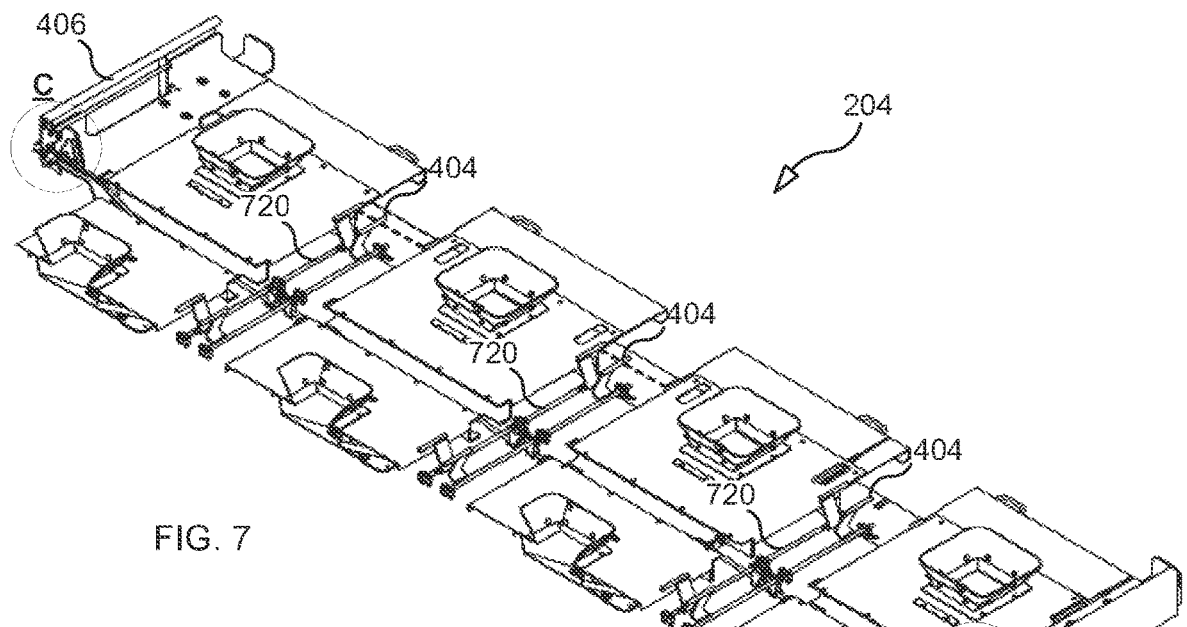
Figure 7B:
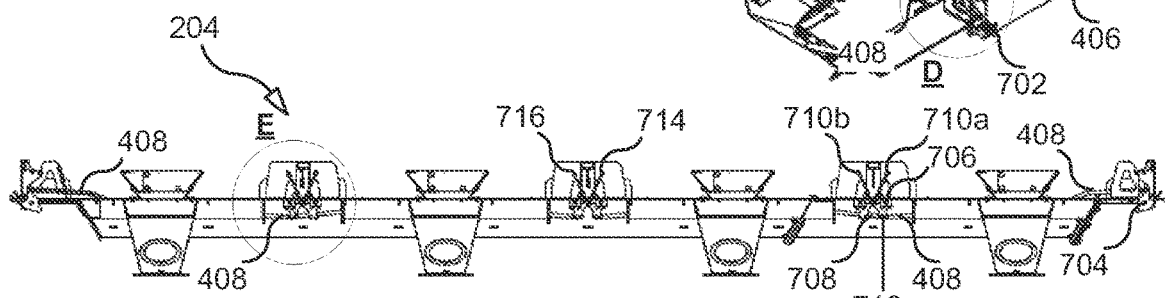

FIG. 7 illustrates a bed 204 of a farm implement 200 according to some embodiments. FIG. 7 shows a perspective view; FIG. 7A shows a top view of FIG. 7; and FIG. 7B shows a cross-section of line D-D shown in FIG. 7A. FIG. 7 shows two circles, labeled C and D, and FIG. 7B shows a circle labeled E. Detailed views of those regions are shown in FIGS. 7C, 7D, and 7E. As shown, the latch mechanism is latched in these figures. End panels 406 are shown in a vertical position, and center latches 404 are in a position to engage the flange 410 of bulk seed-box 100. Handle mechanism 702 is attached to each end panel 406. To move the latches between a latched position and an unlatched position, a user may engage the handle mechanism 702. In some embodiments, this may include a removable keeper (e.g., keeper 721 shown in FIG. 7D) which locks the handle mechanism while it is inserted. The keeper may be included in some embodiments in order to prevent accidental operation of the handle mechanism, such as during movement of the farm implement. Upon removal of the keeper, a user can raise a handle that is part of the handle mechanism 702. This, in turn, raises a pin, allowing the end panel 406 to pivot outward about pivot point 704. When the end panel pivots outward about pivot point 704 (moving from a latched position to an unlatched position), the movement pulls on the push rod 408. The movement of push rod 408, in turn, pulls on the latches 404 that are connected to the push rod. For example, the latch indicated by 710a (see FIG. 7B) is pivoted about pivot point 706 because push rod 408 is connected to a bottom portion 712 of latch 710a. Additionally, latches 710a and 710b are connected by an extension 708, which causes latches 710a and 710b to be controlled together, i.e., when push rod 408 pulls on latch 710a it also pulls on latch 710b. As shown in FIG. 7B, the movement of the push rod 408 on the right side of the figure also causes latch 714 to pivot. However, there is no connection 708 provided between latches 714 and 716, and therefore these latches are controlled independently, i.e., when push rod 408 pulls on latch 714 it does not also pull on latch 716. Instead, latch 716 is connected to the push rod 408 on the left side of the figure which is coupled to the other end panel 406.

When an individual latch 404 is activated by the push rod 408, each latch in the same column is also activated because the latches 404 in the same column are connected by a coupling 720. As shown in FIG. 7, coupling 720 may be a rod that couples each latch 404 in the column to the push rod 408.

As shown, the front end panel 406 activates the latches 404 for the front four bulk seed-boxes 100, and the rear end panel 406 activates the latches 404 on the rear four bulk seed-boxes 100. Other configurations are possible. For instance, by connecting the latches 404 within a latch housing 404a using an extension 708, or by not connecting the latches 404 within a latch housing 404a, the latches can be made to operate together or independently, respectively. Accordingly, the front end panel 406 could be made to activate the latches 404 for more than or less than the front four bulk seed-boxes 100. For example, the front end panel 406 could be made to activate the latches 404 for all of the bulk seed-boxes 100. Additionally, in some embodiments, the front end panel 406 could be made to activate the latches 404 for all the bulk seed-boxes 100 in a set number of rows (e.g., the first row), and the rear end panel 406 could be made to activate the latches 404 for all the bulk seed-boxes 100 in the remaining rows (e.g., the second row). In such an embodiment, the couplings 720 may be modified so that the appropriate latches 404 are coupled to the appropriate push rods 408 in order to be activated when the respective end panels 406 are pivoted.

Figure 8A:
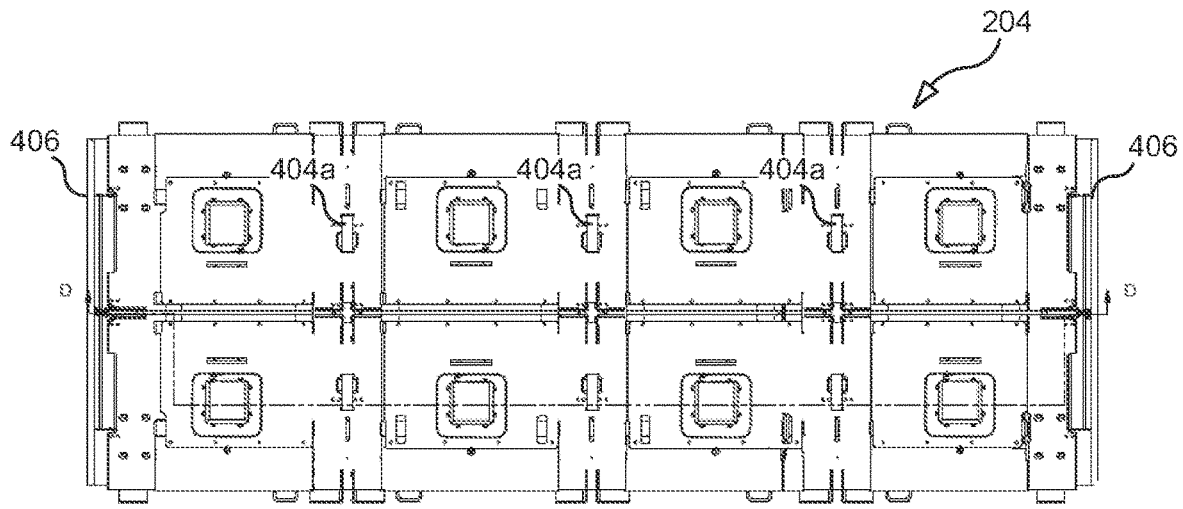
FIGS. 8, 8A, and 8B illustrate a bed of a farm implement in an unlatched position according to some embodiments.
Figure 8:
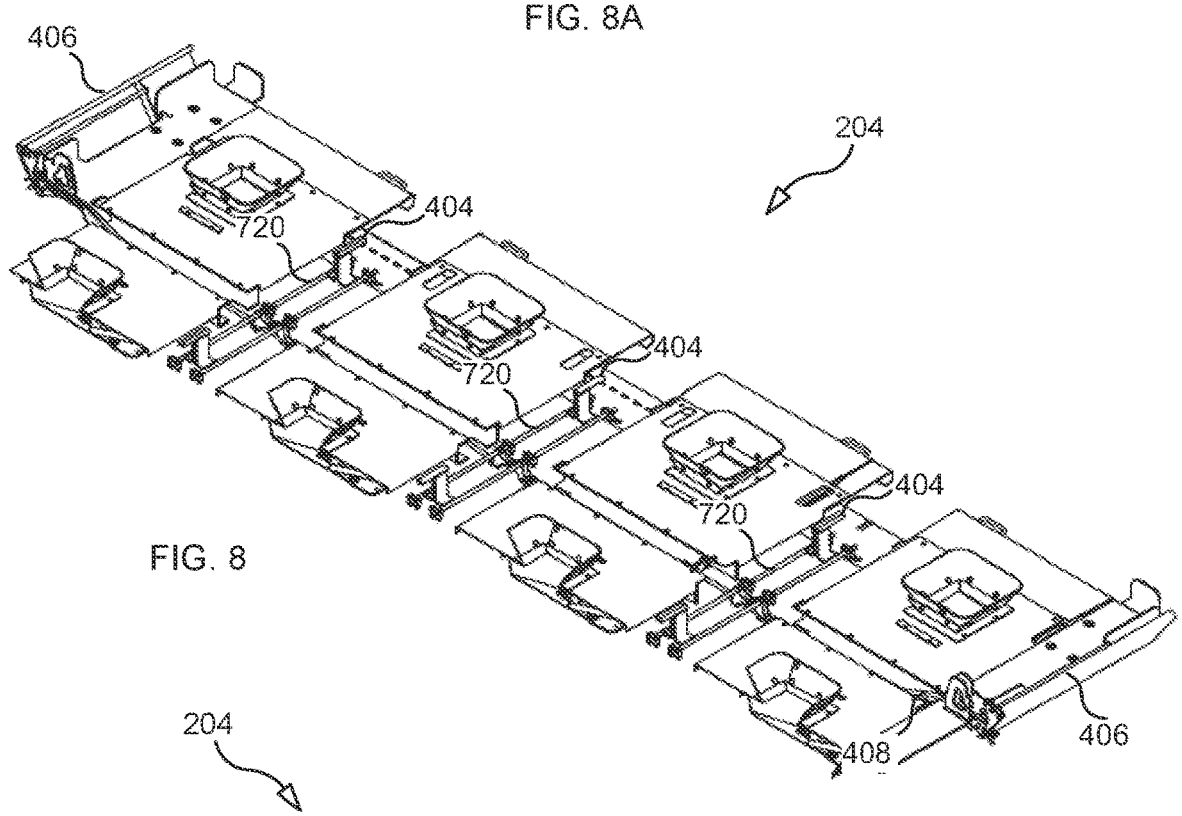
Figure 8B:
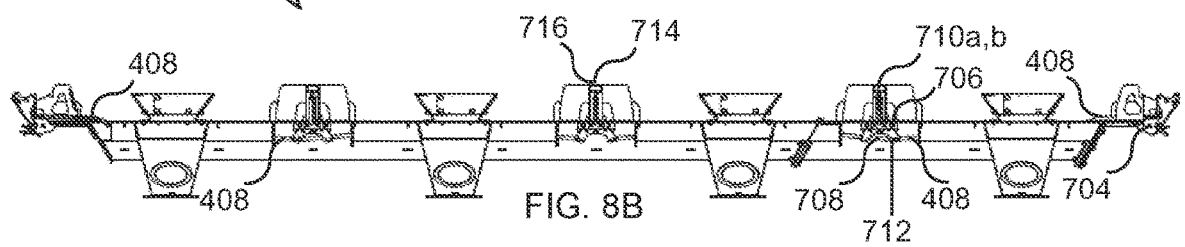

FIG. 8 illustrates a bed 204 of a farm implement 200 according to some embodiments. FIG. 8 shows a perspective view; FIG. 8A shows a top view of FIG. 8; and FIG. 8B shows a cross-section of line D-D shown in FIG. 8A. FIGS. 8, 8A, and 8B show the same configuration as in FIGS. 7, 7A, and 7B, except where FIGS. 7, 7A, and 7B illustrate a latched position, FIGS. 8, 8A, and 8B illustrate an unlatched position. This can be seen, for example, because the end panels 406 are in their downward position, or pivoted outward, and the center latches 404 are confined within their respective housings 404a. Because the latches do not engage with the lower flange of the bulk seed-boxes 100 when in the unlatched position, the bulk seed-boxes 100 may be loaded onto or unloaded from the bed 204 when it is in the unlatched position.

Figure 9A:
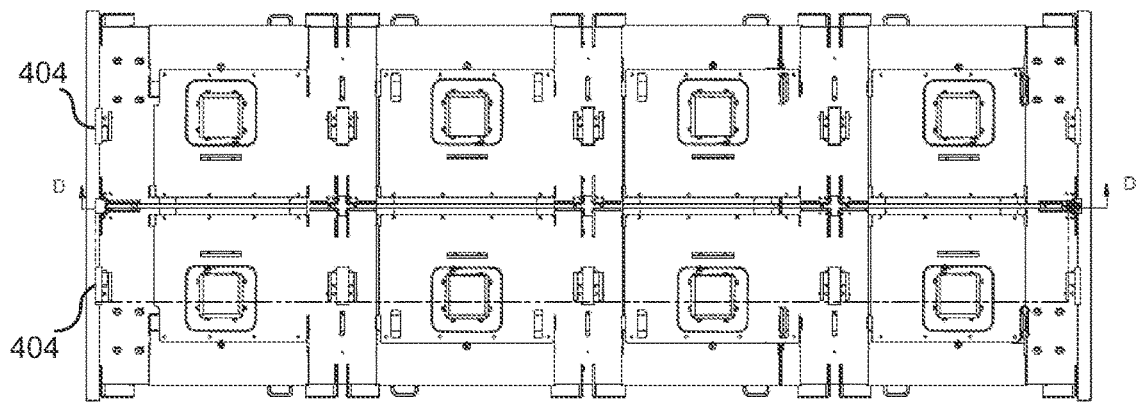
FIGS. 9, 9A, 9B, 9C, 9D, and 9E illustrates bed of a farm implement in a latched position according to some embodiments.
Figure 9C:
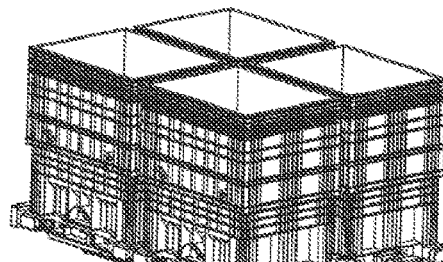
Figure 9:
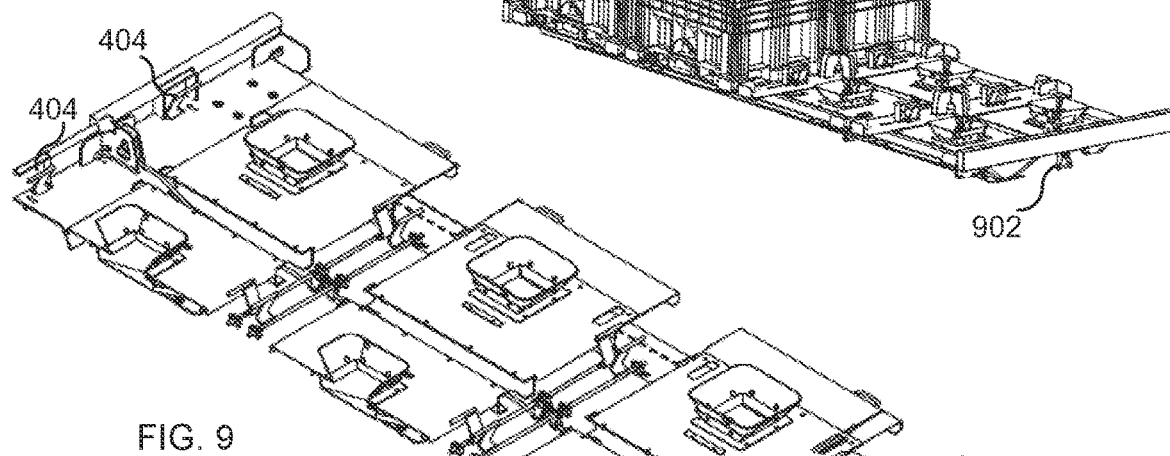
Figure 9B:
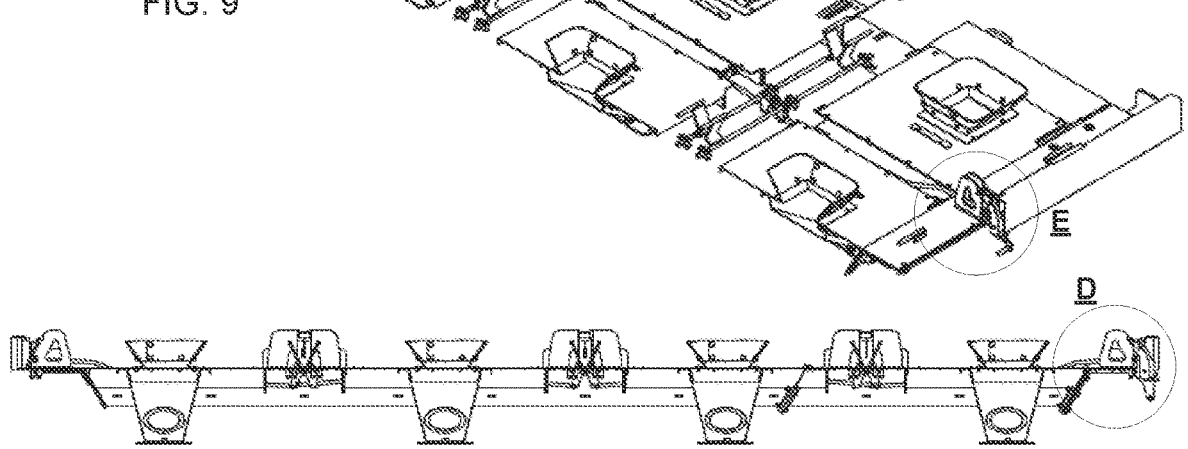
Figure 9D:
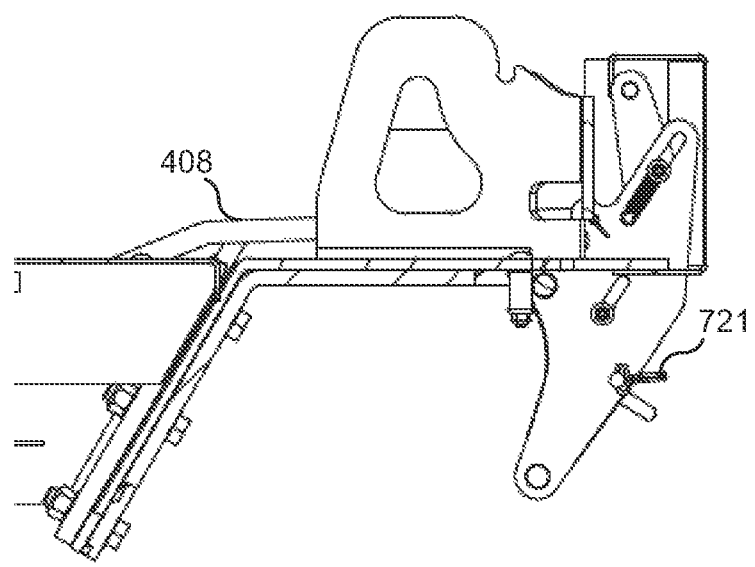
Figure 9E:
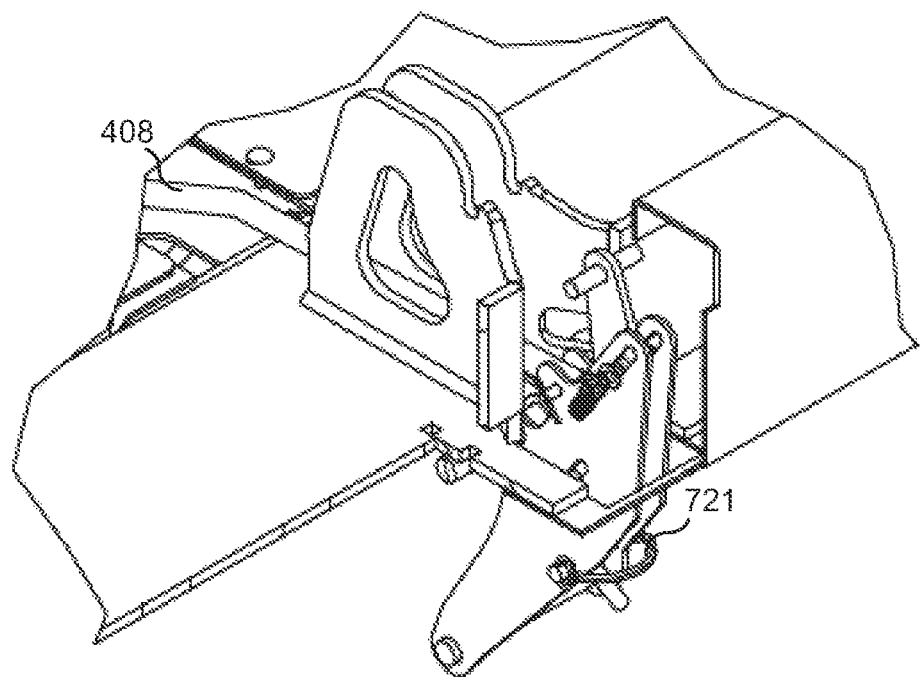

FIG. 9 illustrates a bed 204 of a farm implement 200 according to some embodiments. FIG. 9 shows a perspective view; FIG. 9A shows a top view of FIG. 9; FIG. 9B shows a cross-section of line D-D shown in FIG. 9A; and FIG. 9C shows a perspective view with bulk seed-boxes 100 partially loaded onto bed 204. FIG. 9B shows a circle labeled D and FIG. 9 shows a circle labeled E. Detailed views of those regions are shown in FIGS. 9D and 9E. In the embodiment shown in these figures, which is similar to that shown in FIGS. 7, 7A, 7B, 8, 8A, and 8B, the end panels 406 are fixed and do not move. Instead, the handle mechanism 902 rotates to activate the latches 404 by moving the push rod 408, without the end panels 406 moving. The engagement mechanism 602 of the end panels 406 that are shown in FIG. 6 may, in some embodiments, be replaced by additional latches 404 (e.g., as shown in FIG. 9). The activation of the latches by the push rod 408 is similar to what is described above. There may be a handle mechanism 902 on each of the bed 204, such that each handle mechanism is responsible for controlling the latches 404 for different sets of bulk seed-boxes 100, or there may be a single handle mechanism 902 that is responsible for controlling all of the latches 404 for the bulk seed-boxes 100.

Figure 10A:
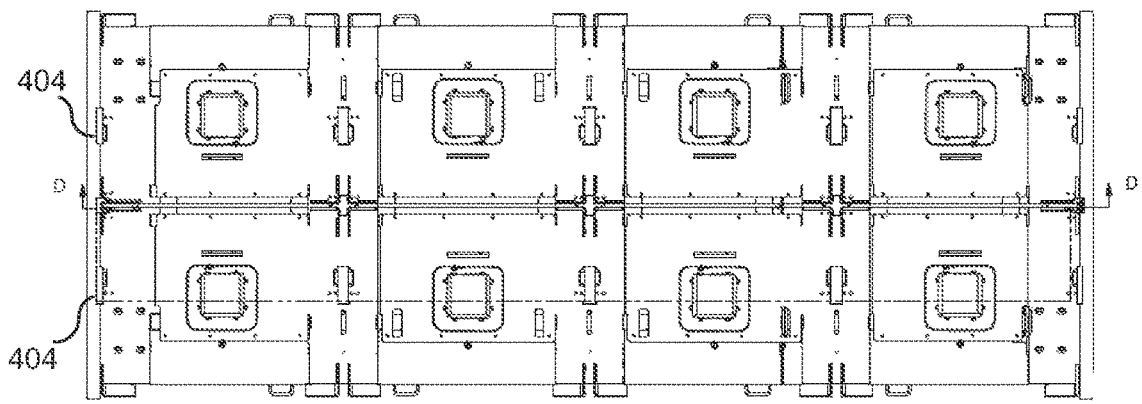
FIGS. 10, 10A, 10B, and 10C illustrate a bed of a farm implement in an unlatched position according to some embodiments.
Figure 10C:
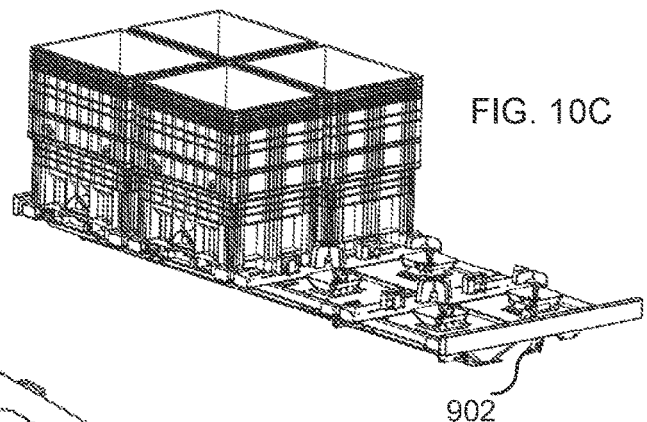
Figure 10:
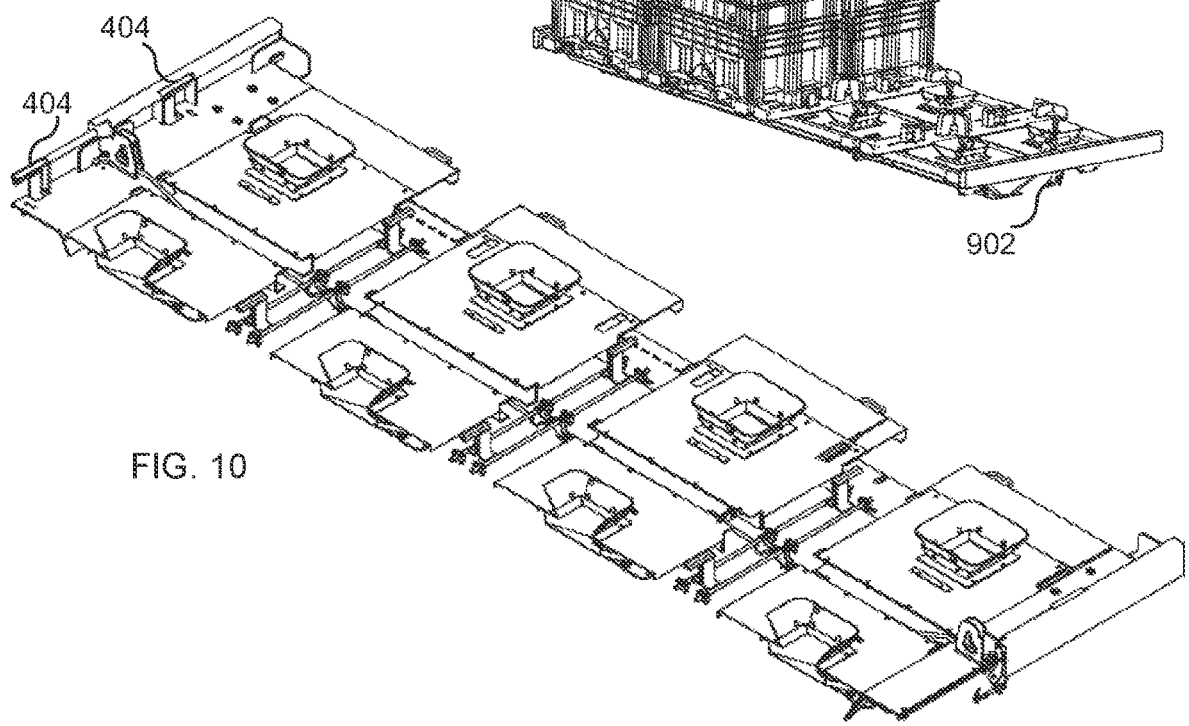
Figure 10B:
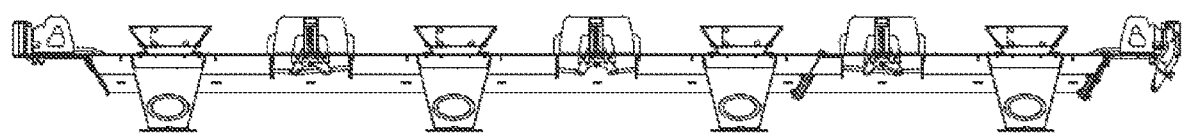

FIG. 10 illustrates a bed 204 of a farm implement 200 according to some embodiments. FIG. 10 shows a perspective view; FIG. 10A shows a top view of FIG. 10; FIG. 10B shows a cross-section of line D-D shown in FIG. 10A; and FIG. 10C shows a perspective view with bulk seed-boxes 100 partially loaded onto bed 204. FIGS. 10, 10A, 10B, and 10C show the same configuration as in FIGS. 9, 9A, 9B, and 9C, except where FIGS. 9, 9A, 9B, and 9C illustrate a latched position, FIGS. 10, 10A, 10B, and 10C illustrate an unlatched position. This can be seen, for example, because the latches 404 are confined within their respective housings 404a. Because the latches do not engage with the lower flange of the bulk seed-boxes 100 when in the unlatched position, the bulk seed-boxes 100 may be loaded onto or unloaded from the bed 204 when it is in the unlatched position.

Various modifications to the designs shown here are possible and within the scope of the disclosed embodiments. For example, push rods 408 may include a turn buckle (e.g., on the ends of the bed 204) in order to allow for adjusting the tension in the latch mechanism. Likewise, while the push rods 408 have been shown as elongated round rods, other shapes or configurations could similarly be used, and other ways to couple the latches 404 together are also possible. For instance, the push rods could be replaced by a set of cables to activate the latches, or a chain-and-sprocket assembly that would allow the latches to move in unison. As another example, the handle mechanism and/or end panels of the embodiments of FIGS. 7-8 and FIGS. 9-10 may be combined in various manners. For instance, in one embodiment, a front end panel may rotate (similar to the embodiment of FIGS. 7-8) while the rear end panel may be fixed (similar to the embodiment of FIGS. 9-10).

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A farm implement comprising:
a frame having a bed, wherein the bed comprises a plurality of bulk seed-box locations;
a first conveyor mounted to the frame having an intake end to receive agricultural material from four or more bulk seed-boxes mounted on the plurality of bulk seed-box locations and a discharge end to discharge the agricultural material; and
a latch mechanism for securing the four or more bulk seed-boxes mounted on the plurality of bulk seed-box locations, the latch mechanism including a first handle to activate the latch mechanism and four or more latches located adjacent to four or more of the bulk seed-box locations, wherein two of the four or more bulk seed-box locations are spaced apart in a lateral direction and two of the four or more bulk seed-box locations are spaced apart in a longitudinal direction,
wherein the first handle is configured to move the latch mechanism between a latched position and an unlatched position,
wherein in the latched position, the four or more latches are configured to engage with the four or more bulk seed-boxes mounted on the plurality of bulk seed-box locations to secure the four or more bulk seed-boxes to the bed, and
wherein in the unlatched position, the four or more latches are configured to disengage from the four or more bulk seed-boxes mounted on the plurality of bulk seed-box locations to allow for the bulk seed-boxes to be unloaded from or loaded onto the bed.

2. The farm implement of claim 1, wherein the farm implement is a seed tender.

3. The farm implement of claim 1, wherein the plurality of bulk seed-box locations are arranged in two or more rows and include at least six bulk seed-box locations.

4. The farm implement of claim 1, wherein the latches are configured to engage a lower flange of the four or more bulk seed-boxes mounted on the plurality of bulk seed-box locations.

5. The farm implement of claim 1, wherein the latches are configured to engage an indentation in the four or more bulk seed-boxes mounted on the plurality of bulk seed-box locations.

6. The farm implement of claim 1, wherein the latch mechanism further includes a first push rod coupled to a first set of the four or more latches, and wherein the first handle is configured to move the latch mechanism between a latched position and an unlatched position by moving the first push rod, and wherein movement of the first push rod engages or disengages the first set of four or more latches.

7. The farm implement of claim 6, wherein the four or more bulk seed-box locations are arranged in rows and columns, and for each bulk seed-box location in a given column, the latches corresponding to those bulk seed-box locations are coupled by a rod that extends transversely from the first push rod.

8. The farm implement of claim 6, wherein the latch mechanism further includes a second handle to activate the latch mechanism and a second push rod coupled to a second set of the four or more latches, and wherein the second handle is configured to move the latch mechanism between a latched position and an unlatched position by moving the second push rod, and wherein movement of the second push rod engages or disengages the second set of four or more latches.

9. The farm implement of claim 1, further comprising a rail mechanism, wherein the first conveyor is configured to move in a fore-and-aft direction with respect to the bed along the rail mechanism, thereby allowing the first conveyor to be positioned such that the intake end is underneath a dispensing region of a bulk seed-box from among the four or more bulk seed-boxes mounted on the plurality of bulk seed-box locations.

10. The farm implement of claim 1, further comprising a hopper mounted to the frame and positioned underneath the bed to receive agricultural material from the four or more bulk seed-boxes mounted on the plurality of bulk seed-box locations and to provide the agricultural material to the intake end of the first conveyor.

11. The farm implement of claim 1, wherein the first conveyor is mounted to the frame by a support arm, and is pivotable such that the discharge end of the first conveyor can be positioned over a planter in order to discharge agricultural material into the planter.

12. The farm implement of claim 1, further comprising a second conveyor for transferring agricultural material from the four or more bulk seed-boxes mounted on the plurality of bulk seed-box locations to the intake end of the first conveyor, wherein the second conveyor is generally parallel to the frame bed.

13. The farm implement of claim 1, wherein the four or more latches are each located in a latch housing, such that each latch housing includes a first latch and a second latch from among the four or more latches, and wherein, for each latch housing, the first latch is engageable with a first bulk seed-box on a first side of the latch housing and the second latch is engageable with a second bulk seed-box on a second side of the latch housing different than the first side.

* * * * *